April 25, 1933. D. S. JACOBUS ET AL 1,905,292
INTERDECK SUPERHEATER FOR WATER TUBE BOILERS
Filed Jan. 29, 1929  4 Sheets-Sheet 1
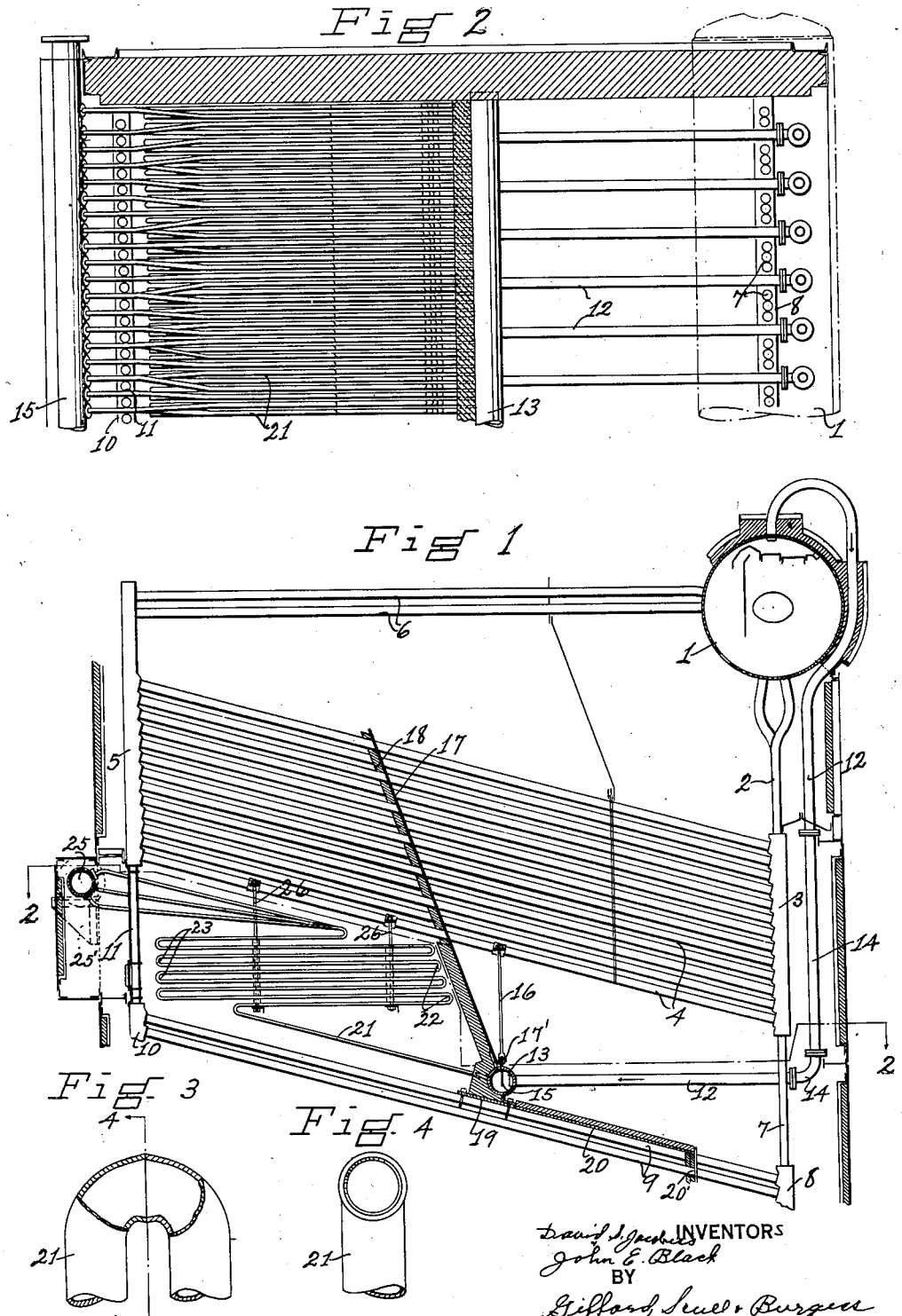

INVENTORS
David S. Jacobus
John E. Black
BY
Gifford, Scull & Burgess
ATTORNEYS

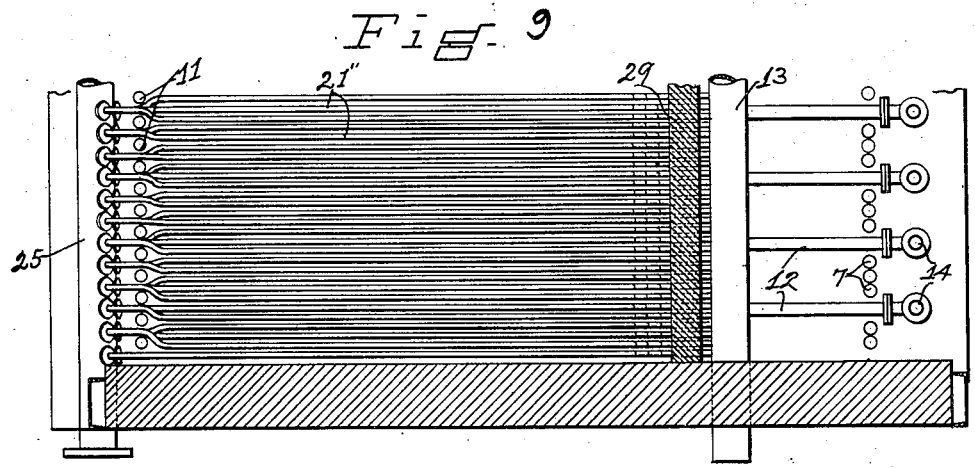
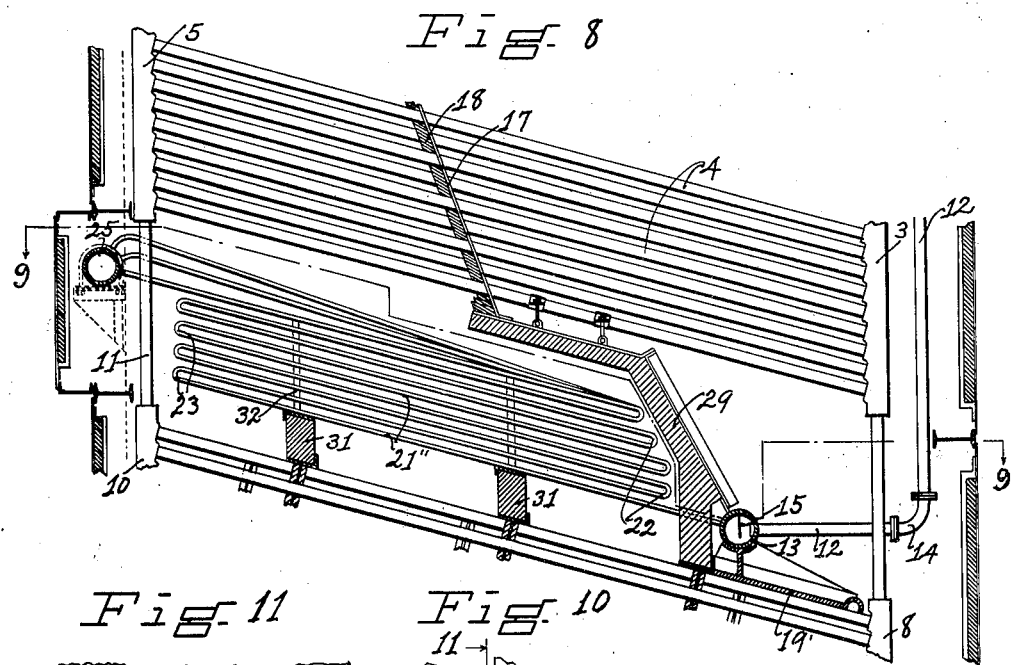
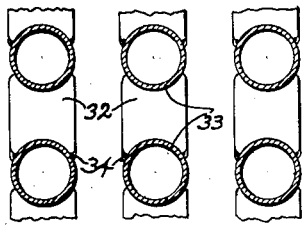
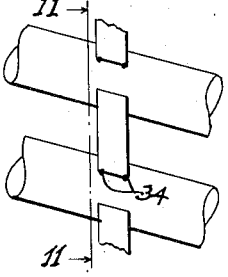

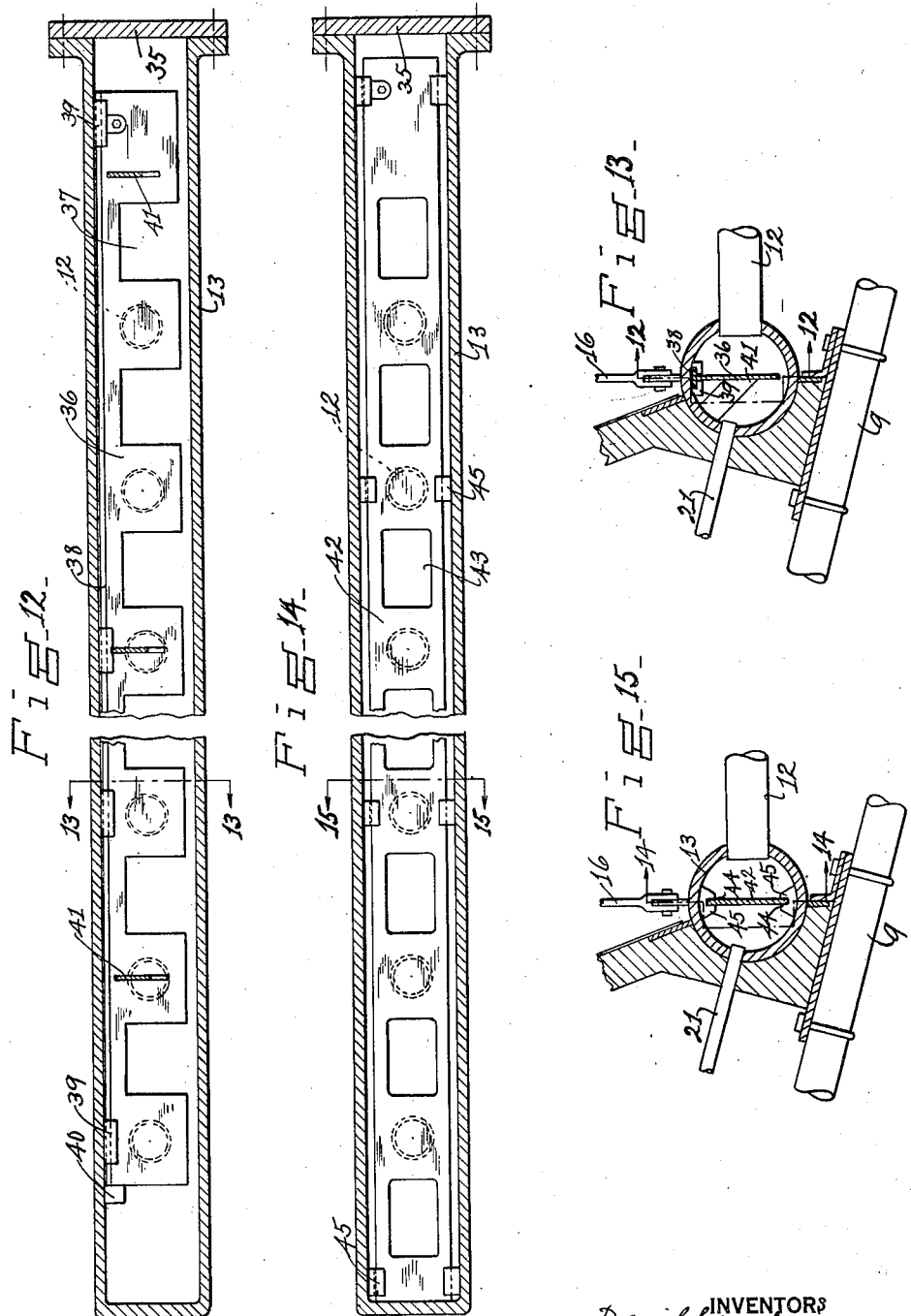

Patented Apr. 25, 1933

1,905,292

UNITED STATES PATENT OFFICE

DAVID S. JACOBUS, OF MONTCLAIR, AND JOHN E. BLACK, OF RUMSON, NEW JERSEY, ASSIGNORS TO THE BABCOCK & WILCOX COMPANY, OF BAYONNE, NEW JERSEY, A CORPORATION OF NEW JERSEY

INTERDECK SUPERHEATER FOR WATER TUBE BOILERS

Application filed January 29, 1929. Serial No. 335,864.

This invention relates to a superheater that is located between banks of inclined tubes of a water tube boiler, the superheater being made up of tubes that are welded together in the form of loops or return bends, which can be made in sections before being assembled in the boiler.

Figure 6:
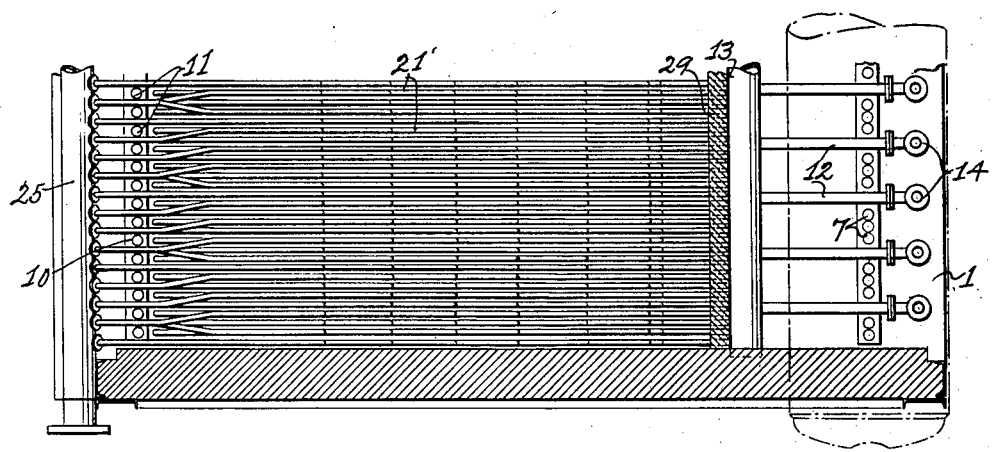
Figure 5:
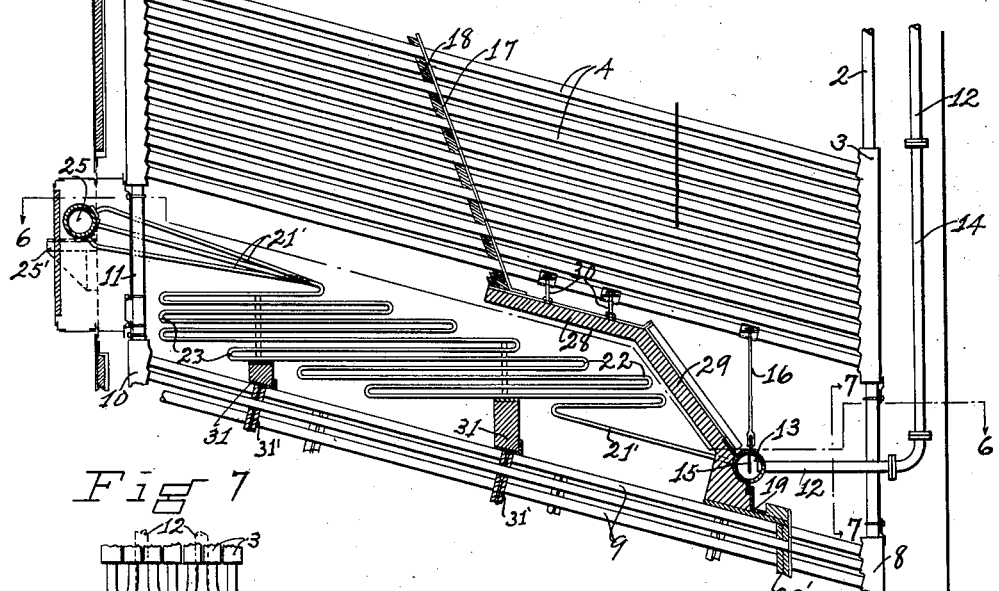
Figure 7:
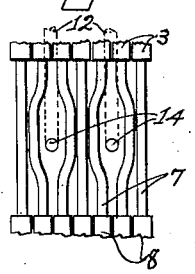

The invention will be understood from the description in connection with the accompanying drawings in which Fig. 1 is a vertical section through an illustrative embodiment of the invention; Fig. 2 is a section along the line 2—2 of Fig. 1; Fig. 3 is a side view partly broken away showing one of the loops of the superheater on an enlarged scale; Fig. 4 is a section along the line 4—4 of Fig. 3; Fig. 5 is a vertical section similar to Fig. 1 showing a modification; Fig. 6 is a section along the line 6—6 of Fig. 5; Fig. 7 is a section along the line 7—7 of Fig. 5; Fig. 8 is a vertical section similar to Fig. 1 showing another modification; Fig. 9 is a section along the line 9—9 of Fig. 8; Fig. 10 is a side view on an enlarged scale partly broken away showing some of the details; Fig 11 is a section along the line 11—11 of Fig. 10; Fig. 12 is a longitudinal section through the superheater inlet header taken along the line 12—12 of Fig. 13; Fig. 13 is a section along the line 13—13 of Fig 12; Fig. 14 is a longitudinal section through the header showing a different form of baffle and taken along the line 14—14 of Fig. 15; and Fig. 15 is a section along the line 15—15 of Fig, 14.

In the drawings, reference character 1 indicates the steam and water drum of a watertube boiler having its water space connected by nipples 2 to downtake headers 3 that are connected by a bank of inclined tubes 4 to the uptake headers 5 which are in turn connected by the circulating tubes 6 to the steam space of the steam and water drum 1. Intermediate nipples 7 connect the lower ends of the headers 3 to the upper ends of the headers 8 which are connected by a bank of inclined tubes 9 to uptake headers 10 that have their upper ends connected to the lower ends of the uptake headers 5 by means of the nipples 11. The banks of tubes 4 and 9 are spaced apart to leave a space in which the superheater may be installed.

A plurality of tubes 12 lead from the steam space of the steam and water drum 1 to the intake header 13 of the superheater that is located between the banks of tubes 4 and 9. The tubes 12 may be provided with removable sections 14. The intermediate nipples 7 between the headers 3 and 8 are bent apart to permit the tubes 12 from the drum 1 to the header 13 to pass between the nipples 7 as most clearly shown in Fig. 7. A baffle or partition 15 is provided in the header 13 extending from its upper portion part way across the same. Straps 16 are connected from the lowermost row or the bank of tubes 4 to the header 13 to aid in supporting the same. Metal plates or strips 17 that are provided with holes for the tubes 4 extend across the tubes 4 and have their lower ends attached to a fin or lugs 17' on the upper side of the header 13 so that this header is supported by the tubes 4. The plates 17 may have refractory material 18 applied thereto thus forming a baffle for the gases. A cross plate 19 extending across the upper row of tubes 9 is located below the header 13 and may help to support this header. A baffle 20 extends along the upper side of the upper row of tubes 9 from the support 19 downwardly to the baffle 20' that extends across the tubes 9 a short distance from the headers 8.

A row of tubes 21 extends from the header 13 and is provided with a plurality of reverse bends or loops 22 and 23 at opposite ends of the superheater. The upper ends of the tubes 21 extend outwardly between the nipples 11. The ends of the tubes 21 are shown as being connected to the superheater outlet header 25 along three longitudinal rows of holes. The outlet ends of the superheater tubes 21 may be welded into the outlet header 25 or they may be connected to it by means of special fittings. The superheater header 25 is supported upon the supports 25' that are attached to the supporting framework for the boiler so that the header remains stationary even when the boiler parts move up and down. The ends of the tubes that are connected to the header 25 are made comparatively long and thereby assist in permitting the relative motion between the boiler parts and the header. Supporting straps 26 extend from the lowermost row of tubes in the bank 4 across the superheater 21 and are connected thereto for supporting the superheater tubes.

The return bends or loops of the superheater are made by bending the ends of straight tubes substantially at right angles to the length of the tubes as indicated in Fig. 3, flaring the ends slightly, then welding the ends together by the well known Thomson electric method of welding. The planes of the welds are parallel to the center line of the straight portion of the tubes when the tubes have been welded together. The tubes can be welded together to provide sections suitable for being shipped separately. The sections can be attached to headers 13 and 25.

In the modification shown in Figs. 5 and 6 a portion of the baffle that extends across the tubes 4 is made parallel to these tubes below the same as indicated at 28 and a baffle 29 extends from the lower end of the baffle 28 to the header 13 or support 19. The portion 28 of the baffle may be supported from the lower row of tubes 4 by means of the supports 30. In this modification the superheater tubes 21' are provided with a larger number of loops or return bends 22 and 23 than is shown in Fig. 1 and the successive loops are in general displaced longitudinally of the tubes as indicated in Fig. 5 so as to make a stepped series of straight portions of the tubes.

The tubes 21' of the superheater are supported upon supports 31 that rest upon the lower bank of tubes 9.

In the modification shown in Figs. 8 and 9 the support 19' below the header 13 extends from the headers 8 to the baffle 29 and provides a baffle along the upper side of the bank of tubes 9 from the headers 8 to the baffle 29. In this modification the tubes 21" are supported upon the supports 31 on the bank of tubes 9 and the return bends or loops 22 and 23 are approximately in vertical lines instead of being stepped as shown in Fig. 5.

Supports for the tubes of the superheater which support the tubes at fixed distances apart are shown in Figs. 10 and 11. The lower ends of these supports rest upon the supports 31. These supports consist of metal sections 32 having rounded ends 33 for the tubes of the superheater and are of such lengths as to keep the tubes spaced apart the proper distances. The metal sections 32 may be spot welded at one end to the tubes as indicated at 34 to prevent displacement, and still permit relative movement between the tubes and the other ends of the sections 32. The supports 31 may be extended across several of the tubes 9 to distribute the weight as shown at 31'.

The sort of baffle or partition 15 that may be used in the superheater inlet header 13 is illustrated in Figs. 12 to 15. The headers 13 are provided with removable ends 35 so that the baffle can be introduced longitudinally of the header. The baffle illustrated in Figs. 12 and 13 consists of a plate 36 extending vertically diametrically almost entirely across the header and is provided with openings 37 that are located so that they can be at points between the prolongations of the tubes 12 when the baffle 36 is in place so as to cause the steam issuing from the tubes 12 to strike the baffle 36 and permit the steam to pass to the other side through the openings 37, thereby causing a proper distribution of the steam along the header 13. The baffle 36 is provided with a flange 38 at the top that rests upon lugs 39 welded to the upper side of the header, thus permitting the baffle to move longitudinally until the inner end thereof contacts with the stop 40 in the header 13. Cross supports 41 may be provided on one side of the baffle perpendicularly to it to steady the baffle.

In the modification of the baffle shown in Figs. 14 and 15 the baffle 42 is provided with holes 43 corresponding to the openings 37 in the baffle 36 and is held in place by resting in notches 44 in the lugs 45 along opposite sides of the header 13.

The parts that are common to the several modifications have been designated by the same reference characters in the different figures of the drawings and the description of all of the parts has not been repeated in connection with each modification.

We claim:—

1. In a boiler superheater, tubes and an inlet header, a plurality of connections from the steam space of said boiler to said header, and means in said header to distribute the steam entering it from said connections.

2. In a boiler superheater, tubes and an inlet header, a plurality of connections from the steam space of said boiler to said header, and a baffle in said header to distribute the steam entering it from said connections.

3. In a boiler superheater, tubes and an inlet header, a plurality of connections from the steam space of said boiler to said header, and a baffle in said header to distribute the steam entering it from said connections, said baffle being provided with openings located between points in line with said connections.

4. In a water tube steam boiler, a boiler setting, a downtake header near one side of the setting, downtake nipples leading downwardly from said header, an uptake header at the opposite side of the setting, uptake nipples leading to said uptake header, a baffle construction located intermediate the uptake and downtake headers and dividing the setting into a high temperature gas pass and a low temperature gas pass, horizontally inclined tubes connecting the headers and extending through the baffle construction, a main bank of return bend superheater tubes suspended below the horizontally inclined tubes and located entirely within the high temperature gas pass, a superheater outlet header supported independently of the support for the main bank of superheater tubes and positioned externally of the setting, a plurality of groups of superheated tubes extending from said header in upright rows positioned between adjacent nipples, bent tube portions connecting the tubes of the vertical rows with the main bank of superheater tubes so that the vertical row arrangement at the nipples changes to a transverse row arrangement in the main bank of tubes, a steam and water drum, connections between the drum and the uptake and downtake headers, and a plurality of tubes extending across the low temperature gas pass conducting steam from the steam and water drum to the main bank of superheater tubes.

5. In a water tube steam boiler, a boiler setting, a plurality of downtake headers arranged one beneath the other at one side of the setting, a corresponding number of uptake headers at the other side of the setting, rows of upright nipples connecting the downtake headers, rows of upright nipples connecting the uptake headers, banks of horizontally inclined tubes arranged with each bank connecting a downtake header to the corresponding uptake header, a baffle intermediate the headers and dividing the setting into a high temperature and a low temperature gas pass, a steam and water drum, circulators connecting the uptake headers to the steam and water drum, downtake nipples connecting the steam and water drum to the uppermost downtake header, a main bank of superheater tubes arranged in loops and positioned in the high temperature gas pass between said banks of horizontally inclined tubes, a plurality of superheater inlet tubes extending across the low temperature gas pass to deliver steam from the steam and water drum to the main bank of superheater tubes, a superheater outlet header positioned externally of the setting, extensions of the tubes of the main bank of superheater tubes connected to the outlet drum and positioned so that they pass between adjacent nipples in vertical rows to positions within the setting wherein they approach the horizontal row alignment of the tubes of the main bank of superheater tubes.

6. In a water tube steam boiler, a boiler setting, an upright downtake header near one side of the setting, downtake nipples connected to said header, an uptake header at the opposite side of the setting, uptake nipples connected to said uptake header, a baffle construction located intermediate the uptake and downtake headers and dividing the setting into a high temperature and a low temperature gas pass, horizontally inclined tubes connecting the headers and extending through the baffle construction, a main bank of superheater tubes located within the high temperature gas pass, a superheater outlet header supported independently of the support for the main bank of superheater tubes, a plurality of groups of superheater tubes extending from said header in upright rows positioned between adjacent nipples, bent tube portions connecting tubes of the vertical rows with the main bank of superheater tubes so that the vertical row arrangement at the nipples changes to a transverse row arrangement in the main bank of tubes, a steam and water drum, connections between the uptake and downtake headers and the drum, and a plurality of tubes extending across the low temperature gas pass conducting steam from the steam and water drum to the main bank of superheater tubes.

7. In a water tube steam boiler, a boiler setting, a bank of steam generating tubes within the setting, a steam and water drum, a row of tubes connected into the boiler circulation through the drum and generating tubes and located along a wall of the setting, a superheater within the setting, and a second row of tubes connected to the superheater and extending between and across the tubes of the first row to a steam chamber, the tubes of one of said rows being so bent that they form a plurality of rows transversely related to their original row at the positions wherein they cross the tubes of the other row.

8. In a water tube steam boiler, a boiler setting, a plurality of downtake headers arranged one beneath the other at one side of the setting, a corresponding number of uptake headers at the other side of the setting, rows of upright nipples connecting the downtake headers, rows of upright nipples connecting the uptake headers, banks of horizontally inclined tubes arranged with each bank connecting a downtake header to the corresponding uptake header, a baffle intermediate the headers and dividing the setting into a high temperature and a low temperature gas pass, a steam and water drum, circulators discharging fluid from the uptake headers to the steam and water drum, downtake nipples connecting the steam and water drum to the uppermost downtake header, a main bank of superheater tubes positioned in the high temperature gas pass between said banks of horizontally inclined tubes and arranged in horizontal row alignment in a plurality of rows, a plurality of superheater inlet tubes extending across the low temperature gas pass to deliver steam from the steam and water drum to the main bank of superheater tubes, a superheater outlet header positioned externally of the setting, extensions of the tubes of the main bank of superheater tubes connected to the outlet drum and positioned so that they pass between adjacent nipples in vertical rows to positions within the setting wherein they approach the horizontal row alignment of the tubes of the main bank of superheater tubes.

9. In a water tube steam boiler, a boiler setting, a bank of steam generating tubes within the setting, a baffle separating a high temperature gas pass from a low temperature gas pass, a steam and water drum, a row of tubes connected into the boiler circulation which extends through the drum and generating tubes, said row of tubes being located along a wall of the setting, a superheater within the setting, means for positioning the superheater in the high temperature gas pass, and a second row of tubes connected to the superheater and extending between and across the tubes of the first row to a steam chamber, the tubes of one of said rows having portions bent out of the row to form a plurality of smaller rows transversely related to their original row at the positions wherein they cross the tubes of the other row.

10. In a steam boiler, vertically spaced banks of horizontally inclined steam generating tubes, uptake and downtake headers at the opposite ends of the banks of tubes, upwardly directed nipples connecting the corresponding headers of the vertically spaced banks, a furnace discharging heating gases across said tubes, a baffle arranged transversely of the banks of tubes intermediate the ends thereof, and extending across the spaces between the banks of tubes to divide the first gas pass from the second, a superheater header located in the second gas pass near the baffle, a second superheater header positioned externally of the nipples, and superheater tubes extending from the first header through the baffle and then back and forth across the first gas pass, the superheater tubes arranged in a horizontal row within the gas pass with that row having its tubes bent beyond the row to form a plurality of upright rows where they pass between the nipples and to the second header.

11. In a steam boiler, an upper bank of horizontally inclined steam generating tubes, uptake and downtake headers for the upper bank, a lower bank of horizontally inclined steam generating tubes spaced from the upper bank, uptake and downtake headers for the lower bank, a furnace positioned below said bank of tubes so as to discharge heating gases upwardly across all of said tubes with the gases first coming into contact with the tubes of the lower bank throughout their entire lengths, rows of uptake and downtake nipples extending across the spaces between the banks of tubes, and connecting the headers of the lower bank to the headers of the upper bank, a bank of superheater tubes disposed in the gas pass between said banks of steam generating tubes, a first superheater header located externally of the gas pass and connected to the superheater tubes, a second superheater header located externally of the gas pass and externally of one row of said nipples, and superheater tube connections arranged in upright rows between adjacent nipples and extending to a position externally of the row of nipples, the connections in each upright row joining superheater tubes arranged in a single horizontal row within the gas pass.

12. In a steam boiler, steam generating tubes, a steam and water drum, a small diameter superheater header, a plurality of tubes leading from the steam and water drum and arranged in a row at their discharge ends where they are connected to the superheater header at uniformly spaced positions along the length of the header, a plurality of superheater tubes communicating with the superheater header so that each of the first mentioned tubes discharges steam into the header at a position midway of a group of superheater tubes, and means within the superheater header opposite the discharge ends of each of the first mentioned tubes to distribute the steam through said tubes so that the tubes will be uniformly supplied with steam.

13. In a water tube steam boiler, a steam and water drum, a bank of boiler tubes connected to the drum and extending across a gas pass, a bank of return bend superheater tubes forming flat coils supported within the gas pass entirely by said boiler tubes, a superheater header positioned outside the gas pass, means supporting the header independently of the boiler tubes and out of contact with gases moving in the gas pass, tubes connecting the coils and the header and arranged to maintain communication therebetween while permitting movements of the coils relative to the headers due to expansion and contraction, and compression members engaging the return bend tubes to support them from below while the connecting tubes are supported from above.

14. In a fluid heat exchange device, a bank of tubes conducting a fluid in a series flow under high pressure through furnace gases at high temperatures, and inter-tube supporting sections supported by the tubes and welded at one end thereto for heat conductivity, each section having the other end movable with respect to a cooperating and adjacent tube during the operation of the device, the sections thereby maintaining the tubes in their operative relationships while permitting different tubes to have different expansion and contraction movements.

15. In a water tube steam boiler, a steam and water drum, a bank of boiler tubes connected to the drum and extending across a high temperature gas pass, return bend superheater tubes forming flat coils supported within the gas pass by said boiler tubes, inlet and outlet superheater headers outside of the gas pass, means for fixedly supporting the headers independently of the boiler tubes and out of contact with gases moving in the gas pass, tubes connecting the coils and the headers and arranged to maintain communication therebetween while permitting movements of the coils relative to the headers due to expansion and contraction, and means for spacing the superheater tubes and providing for their unequal expansions.

16. In a superheater and boiler organization, a boiler section adapted to be supported by a framework so that its parts may move in response to temperature changes, a superheater having coils supported entirely by the steam generating tubes of the boiler section, an outlet header, means secured to the framework for supporting the header independently of the movable parts of the boiler section, and relatively flexibly arranged tubes connecting the superheater coils to the header.

17. In a fluid heat exchange device, a bank of tubes conducting a fluid under high pressure through furnace gases at high temperatures with adjacent tubes so arranged for flow of the contained fluid and exposed to the furnace gases as to have different metal temperatures tending to cause different expansion and contraction characteristics, and inter-tube supporting sections supported by the tubes and welded at one end thereto for heat conductivity, each section having the other end movable with respect to a cooperating and adjacent tube during the operation of the device, the sections thereby maintaining the tubes in their operative relationships while permitting different tubes to have different expansion and contraction movements.

DAVID S. JACOBUS.
JOHN E. BLACK.